E. GROAT.
Churn.
No. 167,893. Patented Sept. 21, 1875.
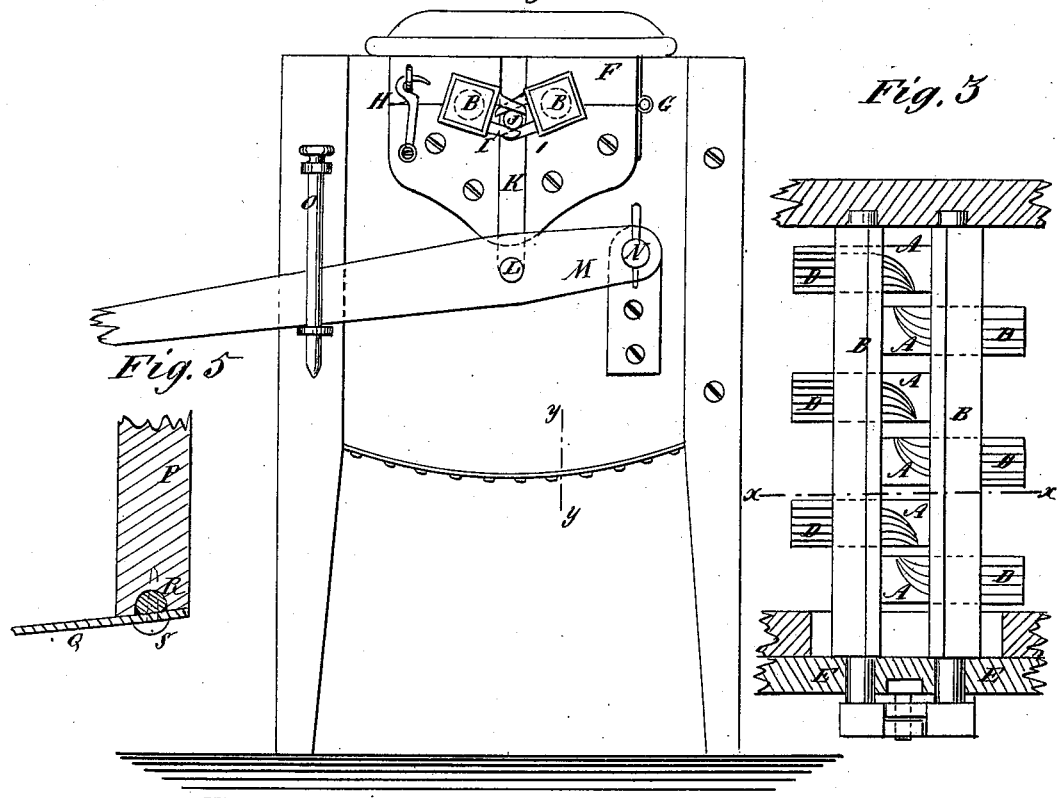
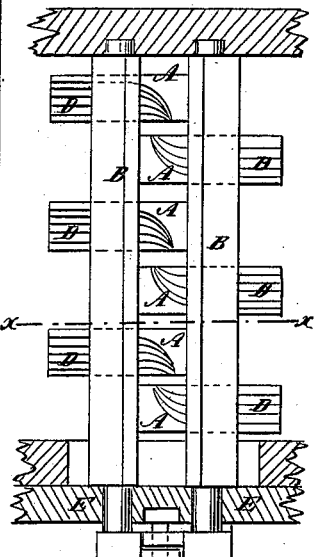
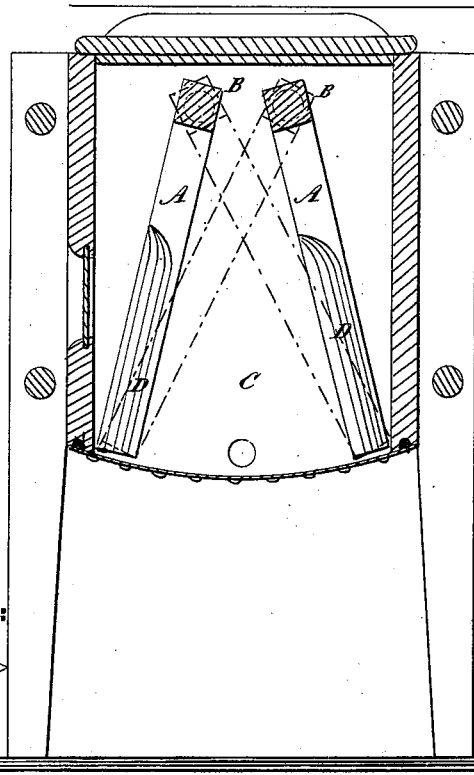
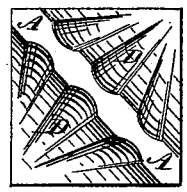
WITNESSES:
C. Neveux
A. F. Terry
INVENTOR:
Elias Groat
BY
Munn & Co
ATTORNEYS.

UNITED STATES PATENT OFFICE.

ELIAS GROAT, OF NAPA, CALIFORNIA.

IMPROVEMENT IN CHURNS.

Specification forming part of Letters Patent No. 167,893, dated September 21, 1875; application filed August 21, 1875.

*To all whom it may concern:*

Be it known that I, ELIAS GROAT, of Napa, in the county of Napa and State of California, have invented a new and Improved Churn, of which the following is a specification:

This invention relates essentially to the churn, of which the dasher consists of two oscillating comb-shaped frames, the fingers of which swing between each other, so as to effect very great agitation of the cream in a simple way; and the first part consists of a fluted or corrugated contrivance of the fingers or beaters, which greatly increases their efficiency. The second part consists of the connection of the beater-shafts with a hand-lever for oscillating them by a slotted arm on each, and a sliding connecting-rod arranged for connecting and disconnecting the shafts readily, to allow of taking out the beaters and putting them in, as is requisite for cleaning out the churn.

Figure 1 is an end elevation of my improved churn. Fig. 2 is a transverse sectional elevation on line $x\,x$ of Fig. 3. Fig. 3 is a horizontal section. Fig. 4 is an end elevation of one of the beaters, and Fig. 5 is a section of Fig. 1, on line $y\,y$.

Similar letters of reference indicate corresponding parts.

A represents the beaters or fingers of the dasher, which are attached to the oscillating heads or shafts B, so as to swing forward and backward in the case C, to agitate the cream. These beaters I now propose to flatten and groove, or corrugate in the lower part, as represented at D, and arrange the flattened and corrugated part at an angle of forty-five degrees, or thereabout, to the plane of oscillation of the beaters. These corrugations are found in practice to very greatly facilitate the work on account of the more thorough breaking of the cream effected by them. The shafts B are held in their bearings E by a cap, F, which opens and closes the bearings by swinging on the pivot G, and has a hook, H, for fastening it down, and each shaft has a short slotted arm, I, extending to and a little beyond the middle of the space between the shafts, and embracing the stud J of a rod, K, sliding in a groove in the end of the case and connecting by a stud, L, with the hand-lever M, which works the beaters. The lever is fixed on a pivot, N, so as to be taken off and put on readily, and it is kept from working off the stud L by the detachable guide-pin O, all so contrived that the working parts can be detached and the beaters taken out and put in without much labor and delay. The working parts are also very simple to make, and they work efficiently.

The method of connecting the bottom of the case, so as to be perfectly tight, is shown in Fig. 5, where P represents one of the sides of the case, Q the bottom, R the cord of packing, and S one of the nails, by which the bottom is nailed through the packing-cord into the side board, the cord being arranged in a groove in the edge of the side board not so deep as the diameter of the cord, so that it is tightly packed between the bottom and side.

Having thus described my invention, I claim as new and desire to secure by Letters Patent—

1. The oscillating beaters A, having corrugated sides D, arranged obliquely to the plane of their oscillation, substantially as specified.

2. The sliding rod K, coupled by stud J to the slotted beater-arms I, and connected detachably by stud L to the detachable hand-lever M, substantially as specified.

ELIAS GROAT.

Witnesses:
   A. P. THAYER,
   T. B. MOSHER.